Fig. 1.

INVENTOR.
HOWARD R. STROUP
BY Walter V. Wright
AGENT

Fig. 4.

Dec. 30, 1969  H. R. STROUP  3,486,636
BALE STACKER
Original Filed Nov. 22, 1966  11 Sheets-Sheet 5

Fig. 6.

INVENTOR.
HOWARD R. STROUP
BY Walter V. Wright
AGENT

Dec. 30, 1969  H. R. STROUP  3,486,636
BALE STACKER

Original Filed Nov. 22, 1966  11 Sheets-Sheet 8

INVENTOR.
HOWARD R. STROUP
BY Walter V. Wright

AGENT

Dec. 30, 1969     H. R. STROUP     3,486,636
BALE STACKER Original Filed Nov. 22, 1966     11 Sheets-Sheet 10

INVENTOR.
HOWARD R. STROUP
BY Walter V. Wright

AGENT

United States Patent Office 3,486,636
Patented Dec. 30, 1969

3,486,636
BALE STACKER
Howard R. Stroup, Rte. 1, Box 71,
Artesia, N. Mex. 88210
Continuation of application Ser. No. 596,314, Nov. 22,
1966. This application Jan. 14, 1969, Ser. No. 792,219
Int. Cl. B65g 57/30
U.S. Cl. 214—6                               7 Claims

ABSTRACT OF THE DISCLOSURE

This invention concerns mechanism for gathering individual bales of hay or the like from a field where they have been randomly deposited by a hay baler and building them into compact stacks particularly suited for subsequent mechanized handling operations.

---

This application is a continuation of an earlier filed co-pending application Ser. No. 596,314, filed Nov. 22, 1966, now abandoned.

The gathering and stacking of bales by hand is a time consuming laborious task. Devices are known which are towed behind a hay baler to accumulate a group of bales and deposit them in the field for subsequent loading onto a wagon or truck. Such collections of bales are rarely ideally arranged for fast mechanized stacking onto a truck or wagon. Either the bales must be stacked onto the wagon by hand, or still another piece of specialized loading equipment must be employed.

It is an object of this invention to provide a device for gathering individual bales of hay or the like from the ground and arranging them into stack units several bales high suitable for further mechanical handling.

It is another object of this invention to provide a device for gathering individual bales of hay or the like from the ground and arranging them into structurally stable stack units wherein a practical number of bales may be subsequently handled as a unit by a conventional tractor mounted scoop, or fork.

It is another object of this invention to provide a device of the above character mountable on, and operable by, a conventional farm tractor.

It is another object of this invention to provide a bale stacking device utilizing a minimum number of gentle bale handling operations thereby minimizing leaf loss.

It is another object of this invention to provide a device of the character stated above which operates close to the ground thereby minimizing the power and mechanism required to form completed stacks of bales.

It is another object of this invention to provide a device of the above character which receives bales in the orientation, relative to the ground, in which the bales emerge from a hay baler and forms stacked rows of bales without reorienting the bales relative to the ground.

It is another object of this invention to provide a bale accumulating and stacking device which readily accommodates bales of a wide range of standard sizes and which is insensitive to variations in the length of individual bales of a given standard size.

It is another object of this invention to provide a bale gathering and stacking device which will not jam in the event that a bale is engaged by the apparatus before the handling operations of the precedingly received bale have been completed.

These and other objects and advantages of this invention will be apparent upon reference to the following specification and claims taken in conjunction with the accompanying drawings wherein:

FIGS. 9, 10, and 11 are enlarged detail plan views, respectively, of the upper, middle, and lower valve units of the control valve unit shown in FIG. 6;

FIGS. 25–27 are diagrammatic end views of the stacker corresponding to the structural view shown in FIG. 5 and illustrating in sequence, the manner in which the load of bales illustrated in FIG. 24 is discharged from the stacker.

The mechanism of the present invention may be more easily followed if the basic subcomponent elements of the device are first identified and their interrelationships generally understood. With this general goal in mind, and referring to FIGS. 1, 2, and 3 of the drawings, it may be seen that a conventional farm tractor 30 equipped with the usual three-point implement hitch linkage 31 is illustrated in the first three figures. An elongated rectangular bale carrying bed 32 is located rearwardly of the tractor and disposed transversely to the direction of travel of the tractor, which is from right to left in FIGS. 1–3. The bale carrying bed 32 is actually the top surface of the horizontal leg portion 34 of an L-shaped frame structure. The vertical leg portion 35 of the L-shaped frame structure extends across the leading edge of the bale carrying bed 32 and vertically upwardly therefrom as may best be seen in FIGS. 2 and 3. It is to the vertical leg 35 of the L-shaped base frame that the tractor three-point hitch linkage 31 connects to mount the stacker on the tractor 30.

Figure 2:
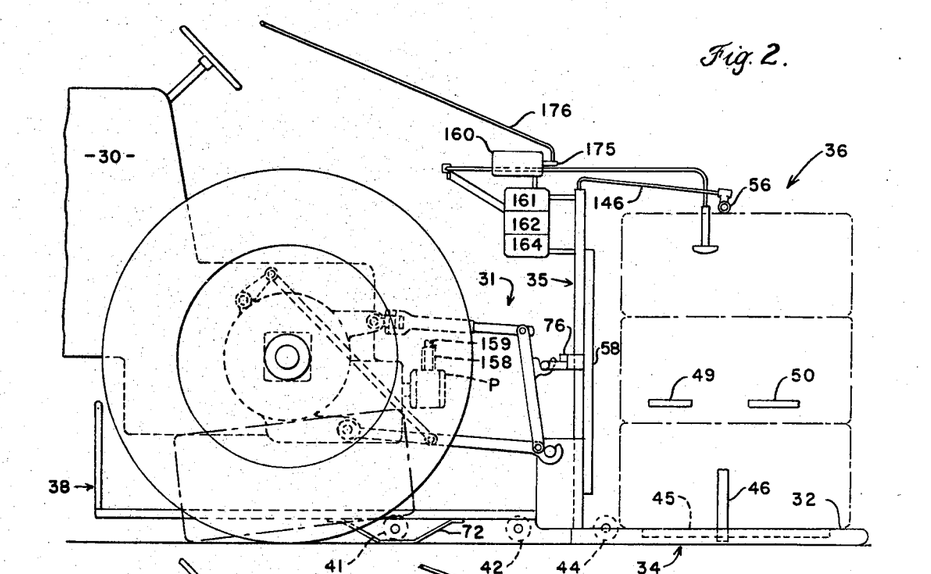
FIG. 2 is a fragmentary side elevational view of the apparatus shown in FIG. 1, with the bale stacked shown in operative, or stacking, position.
Figure 3:
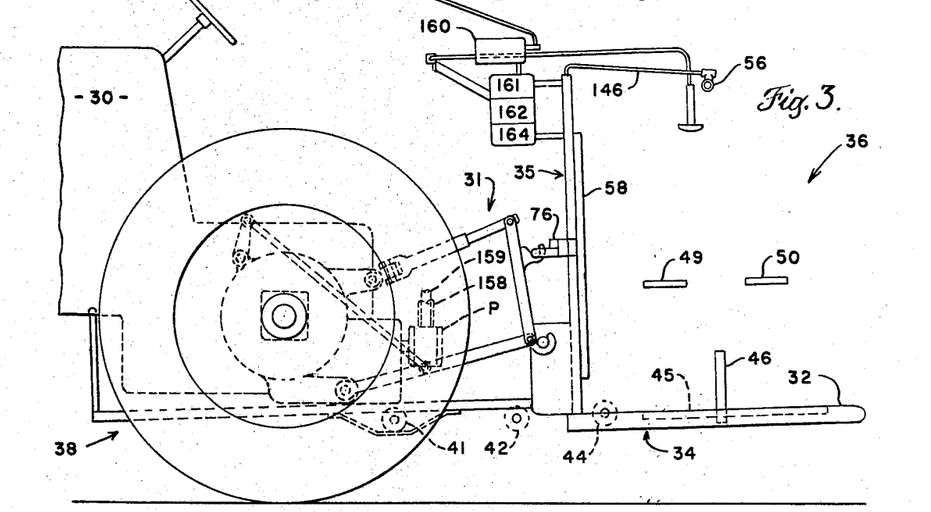
FIG. 3 is a fragmentary side elevational view similar to FIG. 2 but showing the stacker in transport position.

Referring again to FIG. 1 the bale carrying bed 32 projects laterally beyond the right side of the tractor 30. The laterally projecting portion of the bed 32 supports a bale stacking chamber unit 36 which is laterally offset relative to the path of travel of the tractor. A bale receiving, or pickup, device 38 is carried cantilever fashion by bale carrying bed 32 and projects forwardly of the bale carrying bed in front of stacking chamber 36 and alongside the tractor 30. It should be noted in FIGS. 2 and 3 that the pickup device 38, the bottom of stacking chamber 36, and the bale carrying platform 32 lie substantially in a common horizontal plane which is parallel to, and just above, the ground surface when the device is in operation. The operative position of the bale stacker is shown in FIG. 2 while FIG. 3 illustrates the device in transport position.

Figure 1:
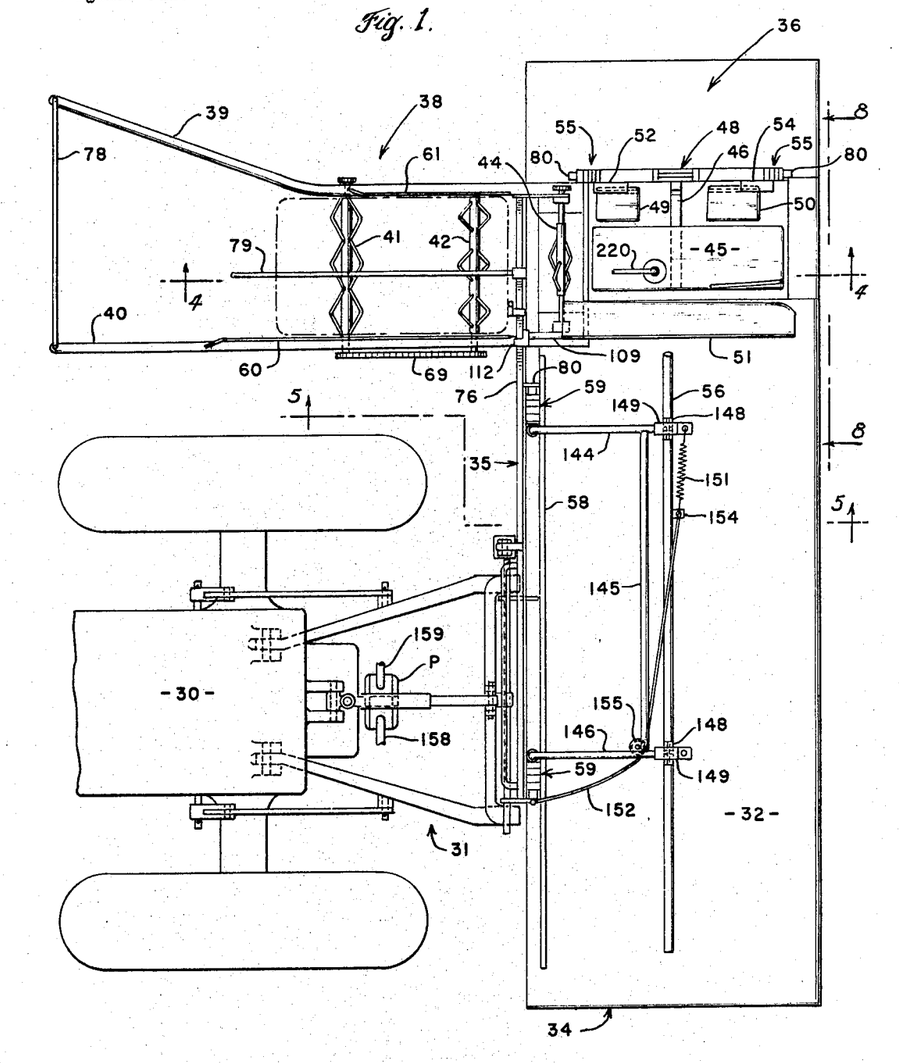
FIG. 1 is a semi-diagrammatic plan view of a bale stacker constructed in accordance with the principles of the present invention snown mounted on a tractor provided with conventional three-point hitch implement mounting linkage.

Still referring to FIG. 1, the pickup device 38 comprises, basically, a pair of forwardly extending arms 39 and 40, to engage the sides of bales lying on the ground and orient them parallel to the direction of travel of the tractor, and a series of three rotary feeding elements 41, 42, and 44 to pick up each bale and deliver it rearwardly into the stacking chamber 36.

The stacking chamber 36 is open forwardly to receive bales and open on the left side (the side toward bale carrying bed 32) to discharge vertical columns of bales after they have been formed in the chamber. The bottom of bale stacking chamber 36 comprises a horizontal bale elevating plate 45 which normally lies in the plane of bale carrying bed 32 as may be seen in FIGS. 2 and 3. The elevator plate 45 is supported by the horizontal arm of an L-shaped member 46 whose vertical arm is mounted for vertical reciprocation in a track 48 which is generally illustrated in FIG. 1 and will be more fully described hereinafter. A set of three pivoted bale supporting members 49, 50, and 51 are mounted on the stacking chamber frame structure slightly in excess of a bale height above the plane of bale carrying bed 32. Generally speaking, the coaction between elements 45 and 49–51 is as follows: A bale delivered rearwardly into stacking chamber 36 by pickup device 38 rests on elevator plate 45 and lies underneath the pivoted elements 49, 50, and 51. The element 45 is then elevated, carrying the bale with it; the bale pivots elements 49, 50, and 51 upwardly until it is above the pivoted elements which then swing back to their illustrated horizontal positions; the elevator plate 45 returns to its bottom position letting the elevated bale resting on top of elements 49, 50, and 51. The next received bale is handled in the same manner until a vertical column of bales of a predetermined height has been built in the stacking chamber by the addition of each successive bale to the bottom of the column.

To discharge a vertical column of bales from the stacking chamber laterally onto the bale carrying bed 32, a pair of vertical pusher bars 52 and 54 (FIG. 1) are incorporated into the outboard side wall structure of the stacking chamber 36. These pusher bars are supported by lazy tong, or scissors, linkage 55 by which they may be extended horizontally across the stacking chamber to push a completed column of bales onto bale carrying bed 32. Upon moving laterally onto bale carrying bed 32, the column of bales passes under a spring loaded horizontal steadying rail 56 (see FIGS. 2 and 3) which prevents the column from upsetting.

The above column forming and discharging operations are repeated until bale carrying bed 32 is full of columns of bales. Incorporated into the vertical leg portion 35 of the L-shaped base frame structure is a pusher frame 58 (see FIG. 1) mounted on lazy tong linkage 59 which may be selectively operated to push the entire load of bales from bale carrying bed 32 rearwardly off the device.

Bale receiving means

Figure 4:
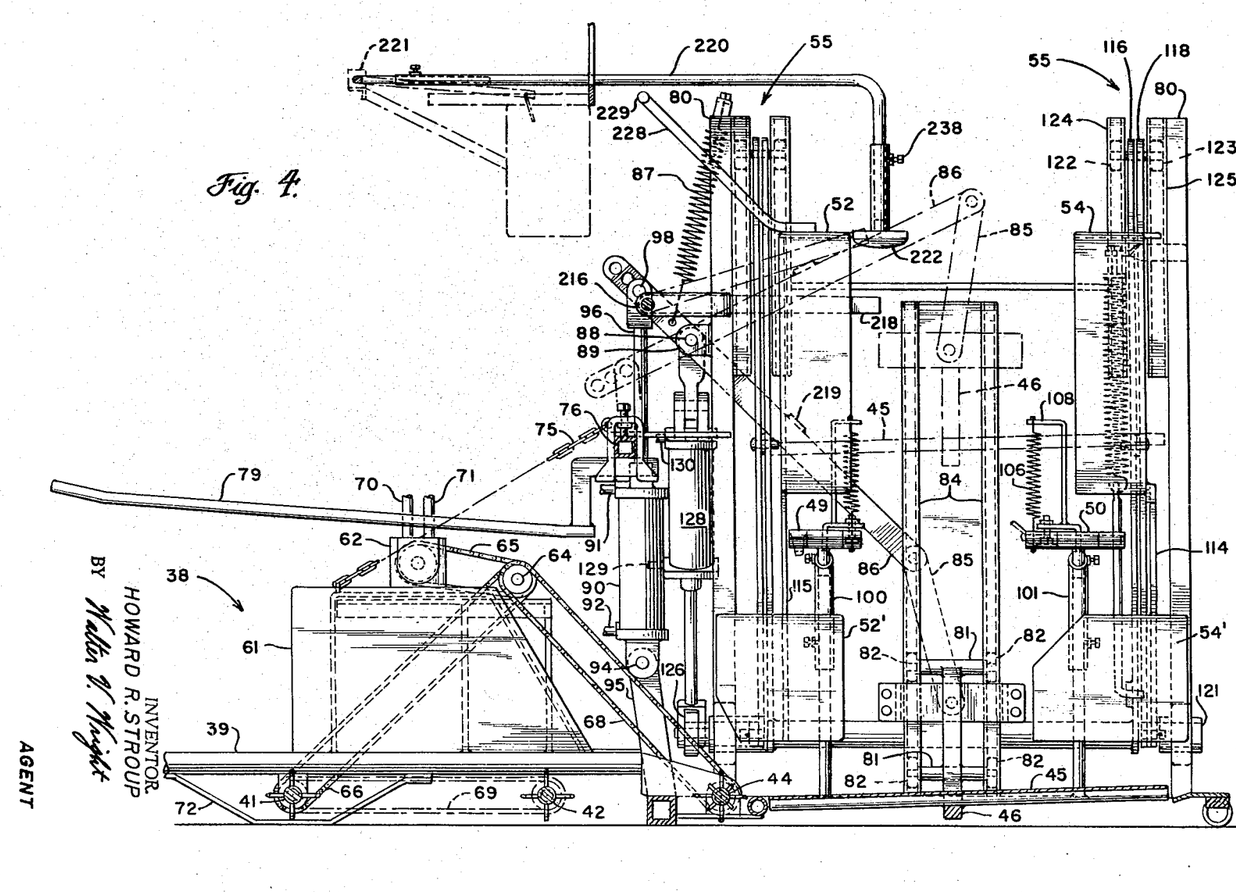
FIG. 4 is an enlarged sectional view taken on the line 4—4 of FIG. 1 showing the details of construction of the stacker.
Figure 5:
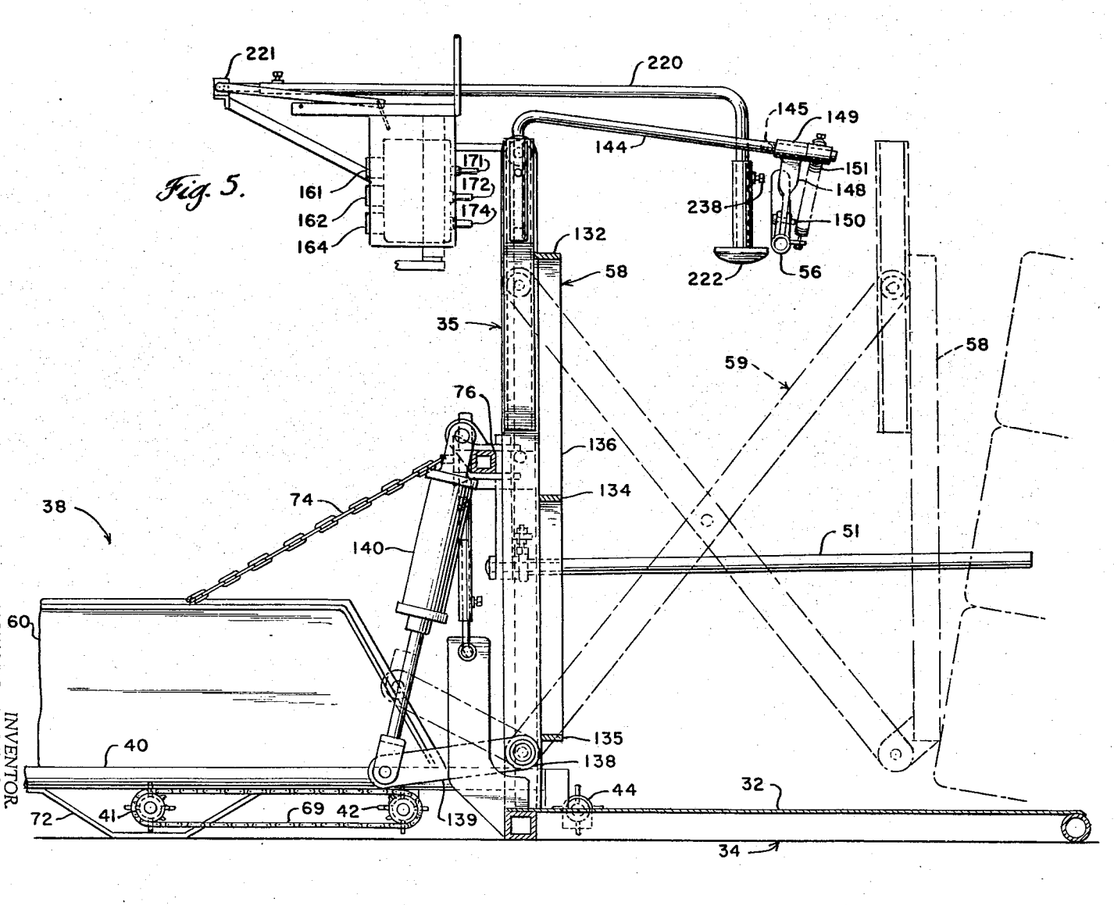
FIG. 5 is an enlarged sectional view taken on the line 5—5 of FIG. 1.

In FIGS. 4 and 5 of the drawings it may be seen that the bale receiving means or pickup 38 includes side frame structures 60 and 61 extending upwardly, respectively, from the forwardly extending arms 39 and 40 of the pickup device. A hydraulic motor 62 (FIG. 4) is mounted atop the side frame structure 61. The motor 62 drives a jack shaft 64 by way of an endless chain 65. The previously mentioned pickup rotary feeding elements 41 and 44 are driven from jack shaft 64 by endless chains 66 and 68, respectively. The central rotary feeding element 42 is driven from forward feeding element 41 by an endless chain 69. In FIG. 4, the hydraulic feed and return lines to hydraulic motor 62 are indicated by the reference numerals 70 and 71, respectively.

The pickup arms 39 and 40 are also preferably provided with ground engageable skids 72 which ride lightly along the ground surface when the device is in operation. The weight of the pickup device is additionally supported from the base frame structure of the machine by chains 74 and 75 interconnected between the pickup upstanding side frame structures 60 and 61 and a cross frame member 76 of the vertical leg portions 35 of the L-shaped base frame structure. At the front of the pickup device (FIG. 1), the arms 39 and 40 are rigidly interbraced by an inverted U-shaped rod 78 under which the bales travel as they enter the pickup device. A boom-like arm 79 is also clamped on cross frame member 76 as may be seen in FIGS. 4 and 8. Arm 79 extends forwardly over the rotary feeding elements 41, 42, and 44 to hold the incoming bales down into engagement with the rotary feeding elements. Obviously, the direction of rotation of elements 41, 42, and 44 is clockwise as these elements are shown in FIGS. 4 and 5.

Stacking chamber unit

The various elements and mechanisms that constitute the bale stacking chamber are supported on a plurality of upright frame members 80 which are identified in FIG. 1 as well as in the more detailed figures. In FIG. 4, the elevator plate 45, which was discussed generally in connection with FIGS. 1–3, is visible in section. The L-shaped arm 46 has one portion underlying and supporting plate 45 while the other portion extends upwardly at one side of the plate 45. A pair of spindles 81 (FIG. 4) are fixed to the vertical portion of L-shaped arm 46. Rollers 82 are journalled on the respective ends of the two spindles 81. The rollers 82 ride in vertical channel members 84 which, together, constitute the vertical track indicated generally by the reference numeral 48 in FIG. 1. A relatively short arm 85, visible in phantom lines in FIG. 4, has one end pivotally pinned to the L-shaped arm 46. The other end of arm 85 is pivotally connected to a longer arm 86. These arms are disposed on the outboard side of the stacking chamber upright frame members 80. The arm 86 is pivotally mounted at 88 in a bracket 89 welded to one of the upright frame members 80. A hydraulic cylinder 90 having hydraulic lines 91 and 92 (fragmentarily shown in FIG. 4) has its lower end pivotally connected at 94 to a member 95 which is rigid with the base frame structure. The piston rod 96 of cylinder 90 has its remote end pivotally connected at 98 to the end of the previously mentioned arm 86. From FIG. 4 it will be apparent that contraction of the cylinder-piston rod 90–96 will effect counter-clockwise pivoting of arm 86 about its fulcrum pivot pin 88. This pivoting of arm 86 raises elevator plate 45 to the top position shown in phantom lines in FIG. 4. A spring 87 interconnected between arm 86 and a vertical frame member 80 assists gravity in biasing elevator plate 45 to its lower position.

Figure 8:
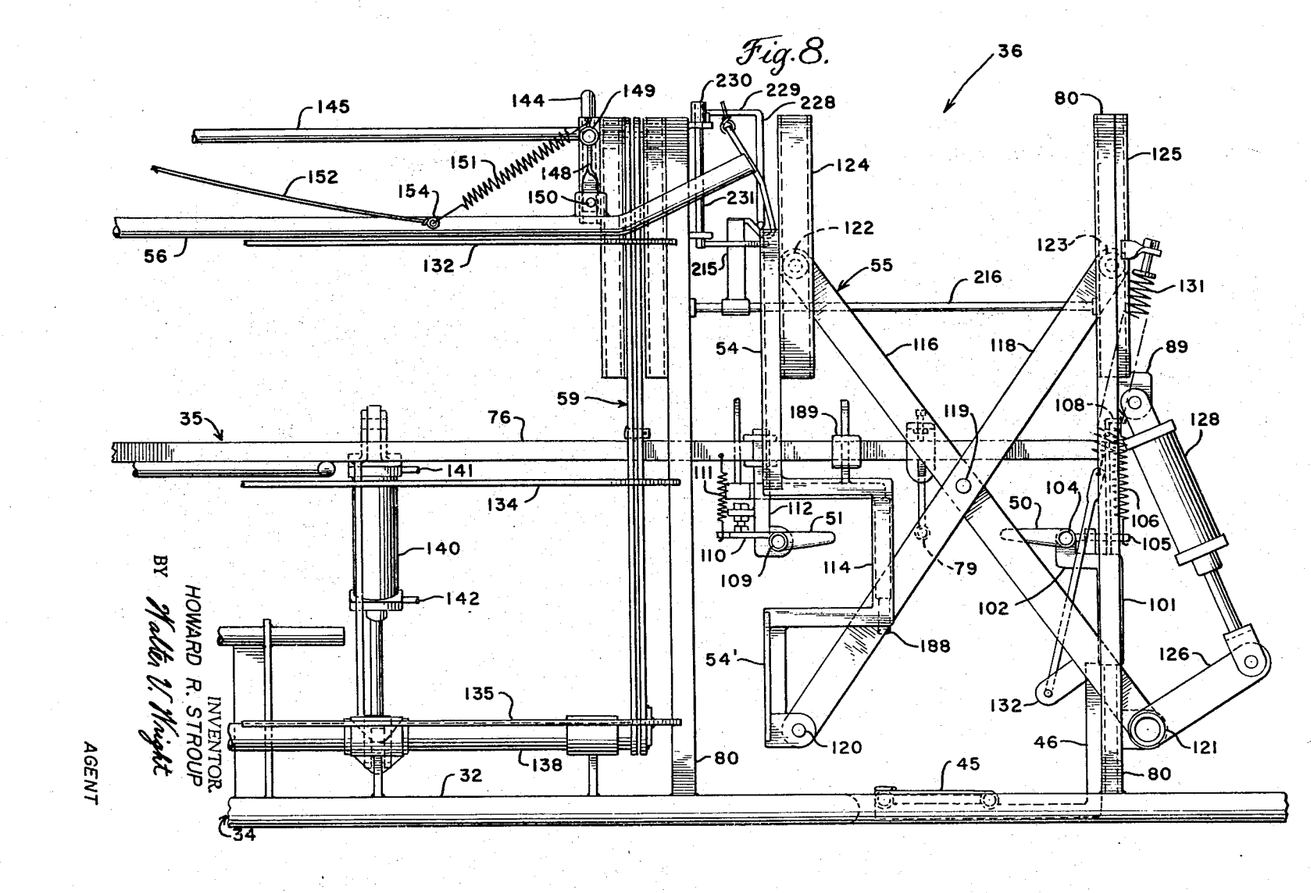

In FIG. 4, the pivoted bale supporting members 49 and 50 are visible while in FIG. 8 the pivoted bale supporting members 50 and 51 are visible. The members 49 and 50 are supported from the bale carrying platform 32 by stanchions 100 and 101, respectively. In FIG. 8 it may be seen that the support stanchion 101 has an inwardly extending horizontal portion 102 at the upper end thereof. A horizontal pivot member 104 is carried by the portion 102 and constitutes a hinge pin for the bale supporting element 50. An arm 105 projects from the side of hinge pin 104 opposite the element 50. Arm 105 is rigid with element 50 so that (FIG. 8) as element 50 swings clockwise upwardly about hinge pin 104, the arm 105 swings clockwise downwardly about the pin 104. A spring 106 (see also FIG. 4) has its lower end connected to arm 105 and its upper end anchored in a vertical extension 108 of the stanchion 101. As may be seen in FIG. 4, the mounting of pivoted bale supporting member 49 is identical to that of bale supporting member 50. The spring 106, and its counter-part for pivoted member 49, cause these two members to snap back to their normal horizontal positions when the elevator plate 45 has raised a bale upwardly beyond the pivoted bale supporting members. In FIG. 8 it may be seen that the bale supporting member 51 has a pivot pin 109, an arm 110 and a spring 111 which perform the same functions for element 51 that elements 104, 105, and 106 perform for the pivoted bale supporting member 50. The pivot pin 109 of bale supporting member 51 is indicated in FIG. 1. The pivot pin 109 is suspended from the base frame cross member 76 by a depending bracket structure 112 shown diagrammatically in FIG. 1 and in greater detail in FIG. 8. Thus, it will be apparent that the left side, or the side facing bale carrying bed 32, of stacking chamber 36 is void of any structure other than the pivot pin 109 and the bale supporting member 51 carried thereby.

In FIGS. 4 and 8, the pusher members 52 and 54, which are generally illustrated in FIG. 1, are shown in greater detail. The vertical pusher members 52 and 54 have cut out portions in the area of the pivoted bale supporting members 49, 50, and 51. The reference numerals 52 and 54 are applied to the portions to the pusher members lying above the bale supporting members 49, 50 and 51 while the portions of the pusher members below the bale supporting members are indicated by the reference numerals 52′ and 54′. Referring to FIG. 8, a U-shaped strap member 114 interconnects the lower end of pusher part 54 and the upper part of pusher part 54′. In FIG. 4, a similar U-shaped member 115 interconnects the elements 52 and 52′. It will be apparent in FIG. 4 that the strap members 114 and 115 lie outside the bale supporting elements 49 and 50. In FIG. 8, it will be apparent that the U-shaped straps 114 and 115 afford clearance space between elements 54 and 54′ and 52 and 52′ for the long cantilevered pivoted bale support member 51, while rigidly fixing the upper and lower portions of the pusher members in a common vertical plane.

The scissors linkage 55 upon which the pusher members 52 and 54 are mounted is shown extended in FIG. 8. The scissors linkage structure is the same for pusher member 52 and 54; therefore, the following description relating to pusher 54 is equally applicable to pusher member 52. The scissors linkage comprises a pair of arms 116 and 118 pivotally interconnected by a pin 119 substantially midway between their ends. The bottom end of arm 118 is pivotally connected at 120 to the lower pusher plate structure 54′. The lower end of arm 116 is rigidly mounted, as by welding, to a pivot pipe 121 journalled on the stacking chamber upright frame members 80. Rollers 122 and 123 are journalled on arms 116 and 118 at the upper ends thereof. The rollers 122 and 123 are carried in vertical channel track members 124 and 125. The track member 124 is welded to the rear face of pusher member 54 while the track 125 is welded to upright frame member 80 of the bale stacking chamber. In FIG. 8, rotation of pivot pipe 121 clockwise from the position shown will cause arm 116 to return to a vertical position in line with vertical frame member 80. This will be accompanied by an upward movement of roller 122 in track 124 and a corresponding upwardly movement of roller 123 in track 125. This will draw the pusher member 54–54′ horizontally to the right in FIG. 8 until it is in line with upright frame member 80 upon which the pivot pipe 121 is mounted. Thus, horizontal reciprocation of the vertical pusher member 54 is controlled by clockwise and counterclockwise rotation of pivot pipe 121. In FIG. 8 it may be seen that an actuating arm 126 has one end fixedly attached to pivot pipe 121. A hydraulic cylinder 128 is interconnected between the free end of arm 126 and the bracket 89 on upright frame member 80. In FIG. 4 it may be seen that the bracket 89 also serves as the fulcrum point for arm 86 of the elevator lift mechanism. The hydraulic lines 129 and 130 of cylinder 128 are fragmentarily indicated in FIG. 4. Expansion and contraction of cylinder 128 acts, through arm 126, to rotate pivot pipe 121 and effect horizontal reciprocation of the vertical pusher members 52 and 54. In FIG. 8, it may be seen that a spring 131 is interconnected between the fixed track member 125 and a lug 132 near the lower end of arm 116. This is simply a return spring to insure that the scissors linkage fully returns to its retracted position when the cylinder 128 is extended and to compensate for free play in the linkage.

The load-carrying bed

Referring primarily to FIGS. 5 and 8, the bale carrying platform is simply a sheet metal plate overlying the horizontal leg portion 34 of the L-shaped base frame. Incorporated into the vertical leg portion 35 of the L-shaped base frame is a vertical pusher frame 58 which is horizontally reciprocable between the solid line position and the phantom line position shown in FIG. 5. This horizontal reciprocation is effected by the scissors linkage generally indicated by the reference numerals 59 in FIG. 1. The pusher frame 58 comprises upper, middle, and lower horizontal bars 132, 134, and 135, respectively. The horizontal pusher bars are interconnected at suitable intervals by vertical bars 136 (FIG. 5) to complete the rectangular pusher frame 58. The scissors type linkage 59 for horizontally reciprocating pusher frame 58 is indicated in its retracted position in FIG. 1 and in its extended position in phantom lines in FIG. 5. This scissors linkage 59 is substantially identical to the linkage 55 previously described in connection with the vertical pusher members 52 and 54 for pushing columns of bales from the stacking chamber onto the load-carrying bed 32. It will be noted in FIGS. 5 and 8 that a horizontal rock shaft 138 extends across the leading edge of load-carrying bed 32 at the base of the vertical leg 35 of the L-shaped main frame. The one arm of each set of scissors links 59 is welded to rock shaft 138. A short arm 139 (FIG. 5) is also rigidly connected to rock shaft 138 and extends forwardly therefrom. A hydraulic cylinder 140 is interconnected between the horizontal cross frame member 76 of the base frame and the forwardmost end of arm 139. Hydraulic lines 141 and 142 for cylinder 140 are fragmentarily indicated in FIG. 8. It will be apparent in FIG. 5 that contraction of the cylinder 140 from the extended position shown in solid lines to the contracted position shown in phantom lines effects clockwise rotation of rock shaft 138 about its own axis accompanied by horizontal reciprocation of the vertical pusher frame 58 from the solid line position to the phantom line position. It may be seen in FIGS. 5 and 8 that the upper ends of the scissors links 59 have the same roller and track connections to the pusher frame 58 and the upright base frame portion 35 as the previously described scissors link 116 and 118 exhibit relative to upright stacking chamber frame members 80 and vertical pusher members 52 and 54.

In FIG. 1 a rectangular frame structure comprising members 144, 145, and 146 may be seen overlying the bale carrying bed 32. The previously mentioned hold down bar 56 is supported by this rectangular frame structure from pusher frame 58. Referring to FIGS. 1 and 5, it may be seen that the hold down bar 56 is suspended from frame arms 144 and 146 by depending brackets 148 having bearing sleeves 149 journalled on the frame members 144 and 146 (see also FIGS. 1 and 8). The depending brackets 148 are pin connected at 150 to lugs welded to the upper side of hold down bar 56. Referring to FIG. 8, it may be seen that the hold down bar 56 is mounted to swing on the frame arms 144 and 146 by the depending brackets 148 and pivot pins 150 and the sleeve journals 149. A spring 151 interconnected between the hold down bar 56 and the rectangular frame structure 144–146 urges the hold down bar 56 to its lowermost position, illustrated in FIG. 8, wherein a stop member (not shown) may be provided to limit the hold down bar 56 against further counterclockwise rotation about the axis of frame member 144. It will be apparent in FIG. 8 that as a column of bales is pushed laterally out of stacking chamber 36 by the pusher members 52 and 54, the column wedges under hold down bar 56 to thereby prevent the column from upsetting. The spring 151 allows bar 56 to swing counterclockwise about frame arm 144 as necessary, in opposition to the force of spring 151, to accommodate the column of bales. The supporting frames 144, 145, and 146 of the hold down bar 56 is mounted on the scissors linkage track members of pusher frame 58. A cable 152 has one end connected to the hold down bar 56 as indicated at 154 in FIGS. 1 and 8. The cable extends around a pulley 155 (FIG. 1) and has its other end fixedly anchored to the upright frame portion 35 of the L-shaped base frame. From FIG. 1, it will be apparent that as the pusher frame 58 moves rearwardly carrying hold down frames 144–146 therewith, the cable 152 will exert a pull on hold down bar 56 causing it to swing counterclockwise upwardly from its FIG. 8 position about the axis of frame member 144. This raises the bar 56 off the columns of bales which it is normally holding down onto bale carrying bed 32 thereby allowing the bale columns to be pushed off the rear of the device without interference from the hold down bar 56.

Hydraulic cylinder control

Figure 28:
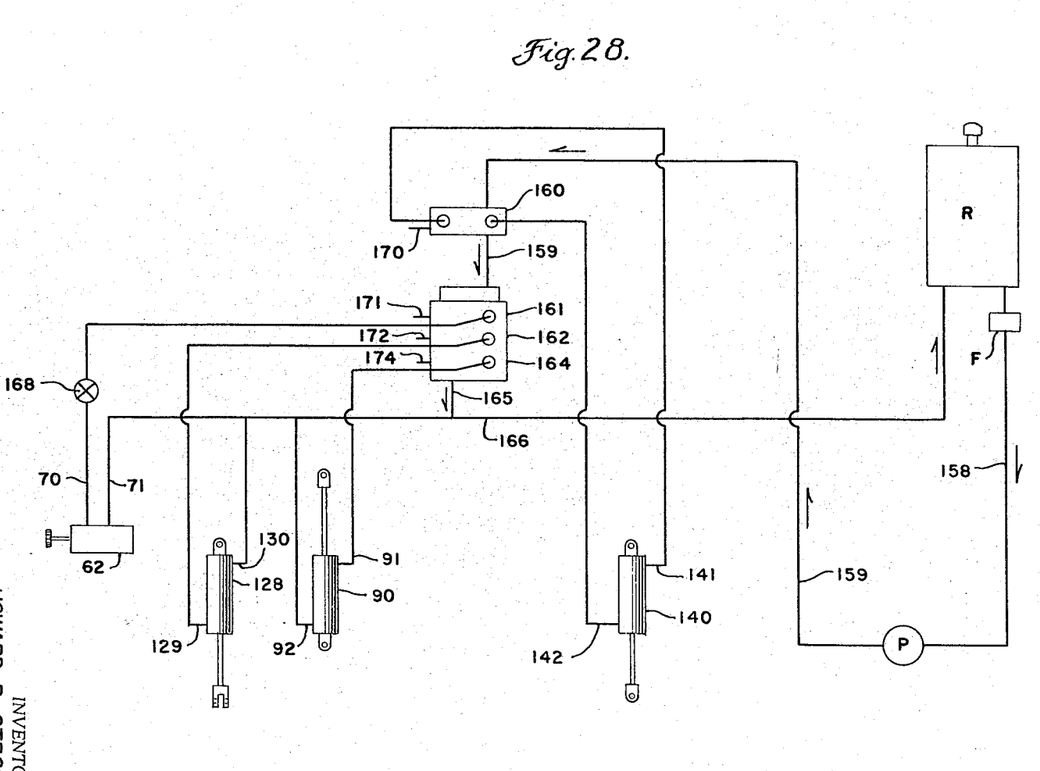
FIG. 28 is a diagram of the hydraulic system for operating the mechanism of the present invention.

In FIG. 28, a hydraulic fluid reservoir R is shown. This tank, while not illustrated in the other figures of the drawings, is preferably mounted on the base frame structure of the stacker in a convenient location on upright frame portion 35 of the base frame. A suction line 158 extends from the reservoir through a filter F to a hydraulic pump P. Pump P is of the type that is mounted on the tractor as shown in FIGS. 1–3 and driven by the tractor power take-off shaft. A line 159 extends from the pressure side of pump P to a double acting valve 160. The pressure line 159 continues through valve 160 to a three-valve control unit having elements identified by the reference numerals 161, 162, and 164, respectively. In FIG. 28 a return branch line 165 extends from the valve unit 161–164 to a common return line 166 to the reservoir R. The return line 71 of pickup drive motor 62; the one line 130 from hydraulic cylinder 128 of the column pusher mechanism; and the one line 92 from cylinder 90 of the bale elevator mechanism all connect into the common return line 166. In FIG. 28 a manually operable valve 168 is indicated in the feed line 70 to pickup drive motor 62. This manual valve may be adjusted as desired to regulate the flow of hydraulic fluid to the pickup motor 62 thereby functioning as a speed regulating throttle for the rotary feeding elements 41, 42, and 44 of the pickup mechanism. The various valves, cylinders, and other component elements of the hydraulic system are commercially available units which have been employed to operate the various mechanisms of the present invention. It is recognized that other hydraulic system components could readily be incorporated into the mechanism of the present invention to perform the necessary power supply and control functions.

The manually, or mechanically, operable control stems for the valves 160, 161, 162, and 164 are indicated, respectively, by the reference numerals 170, 171, 172, and 174. When the device is ready to stack bales and is traveling down a field but has not yet encountered the first bale to be stacked, hydraulic fluid is pumped through line 159 by the tractor PTO driven pump P. The fluid passes directly through the valve 160 to valve 161. The normal position of valve 161 is such that the hydraulic fluid is routed through line 170 to hydraulic motor 62 which drives the rotary feeding elements of the pickup mechanism. From motor 162 the fluid travels through line 71 to the common return line 166 and back to the reservoir. When the pickup device 38 has delivered a bale to the elevator plate 45, the valve operating stems 171 and 174 are manipulated to route the hydraulic fluid from line 159 straight through valves 161 and 162 to valve 164, thereby stopping the operation of hydraulic motor 62 and the pickup rotary feeding elements. Valve 164 routes the fluid through line 91 to cylinder 90 to raise the bale elevating plate 45. When the plate 45 has been fully raised, control linkage which will be more fully explained hereafter reverses valve 164 to allow hydraulic fluid to return back through line 91 to the valve 164 and then through return branch line 165 to the common return line 166 leading to reservoir R. The cylinder 90 is returned to its original position by the pressure of the hydraulic system acting through the return line 166 and line 92 to the underside of the piston in cylinder 90, by gravity acting on the bale elevating mechanism, and by the action of return spring 87 connected to the elevator operating arm 86 and visible in FIG. 4 of the drawings.

When a vertical column of bales has been formed in the stacking chamber 36, the control stem 172 of valve 162 is manipulated to divert hydraulic fluid from the line 159 through line 129 to cylinder 128 to operate the vertical pusher members 52 and 54 through the scissors linkage 55, as described in connection with FIG. 8 of the drawings. At the completion of the push over operation, valve stem 172 is returned to its normal position and the pusher members and cylinder 128 are returned to their original positions by the return line pressure acting through line 130 of hydraulic cylinder 128 and the return spring 131 connected to the scissors linkage 155 as shown in FIG. 8. The pressure is exhausted from the working side of the piston and cylinder 128 back through line 129 to valve 162 and then through branch return line 165 to the common return line 166 of reservoir R.

When the bale carrying bed 32 is full of vertical columns of bales, cylinder 140 is operated to push the entire load rearwardly off the bed 32 as illustrated in FIG. 5 of the drawings. The operation of cylinder 140 is under the control of valve 160. The operating stem 170 valve 160 is controlled by the tractor operator manually by a lever 175 (see FIGS. 2, 6, and 7) having a controlled cord, or rod, 176 connected thereto and extending forwardly to within reach of the tractor operator. Referring again to FIG. 28, the valve 160 is of the double acting type whereby manipulation of the control stem 170 diverts pressure from line 159 through line 142 to contract the cylinder and piston 140 while simultaneously connecting line 141 of cylinder 140 to the portion of line 159 extending between valve 160 and the three valve unit 161–164. Reverse operation of the valve stem 170 diverts hydraulic fluid from line 159 through line 141 to the cylinder 140 while exhausting fluid from cylinder 140 through line 142 to valve 160 and then through the portion of line 159 extending between valve 160 and the three way valve 161–164.

Control valve actuating mechanism

Figure 6:
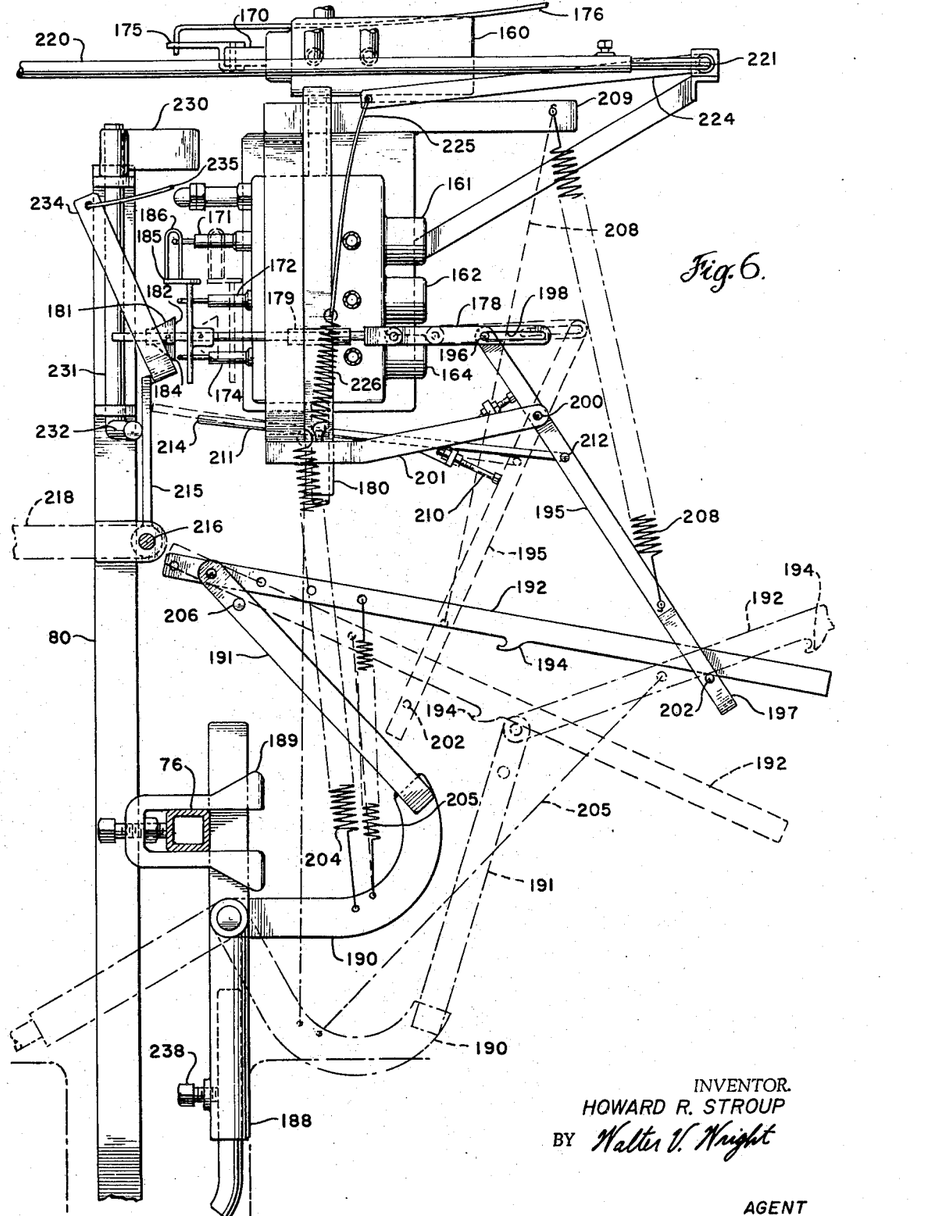
FIG. 6 is an enlarged fragmentary detailed elevational view of a portion of the bale stacker shown in FIG. 5, but taken from the opposite side of the machine from FIG. 5 and showing the stacker control valve operating linkage in three different operative positions, one in solid lines, one in dash lines, and one in dot-and-dash lines.

The location of the three valve unit 161, 162, and 164 on the machine will be apparent from FIGS. 2, 3, and 5. It is supported from the upright leg 35 of the L-shaped base frame structure by suitable mounting brackets. The mechanism for actuating the valve stems 171, 172, and 174 is best illustrated in FIGS. 6, 7, 9, 10, and 11. In FIG. 6 a main valve tripping rod 178 is visible. This rod is supported by, and horizontally slidable in, a sleeve 179. The sleeve 179 is carried by a vertical rod 180 which is suitably supported on the valve mounting bracket structure for vertical reciprocation. A cam-like trip member 181 is fixedly mounted on rod 178. The extent of vertical reciprocation of the rod 180, its mounting sleeve 179 and the horizontal main actuating rod 178 is such that the cam member 181, having upper and lower cam faces 182 and 184, may be moved sufficiently in the vertical direction to have cam face 184 trip valve stem 174 when the rod 178 is in its lower position, while having cam face 182 trip valve stem 172 when the rod 178 is in its upper position. An additional arm 185 extends vertically upwardly from rod 178 and is fixedly mounted on the rod 178. At the upper end of arm 185 is a loop 186 encircling upper valve stem 171 and affording vertical lost-motion between the arm 185 and the valve stem 171 equal to the amount of vertical reciprocation of the arm 178, sleeve 179 and vertical supporting arm 180. Thus, with the parts in the position shown in solid lines in FIG. 6, horizontal reciprocation of arm 178 to the right will result in the cam face 184 tripping valve stem 174, while the loop 186 of arm 185 trips valve stem 171.

Figure 9:
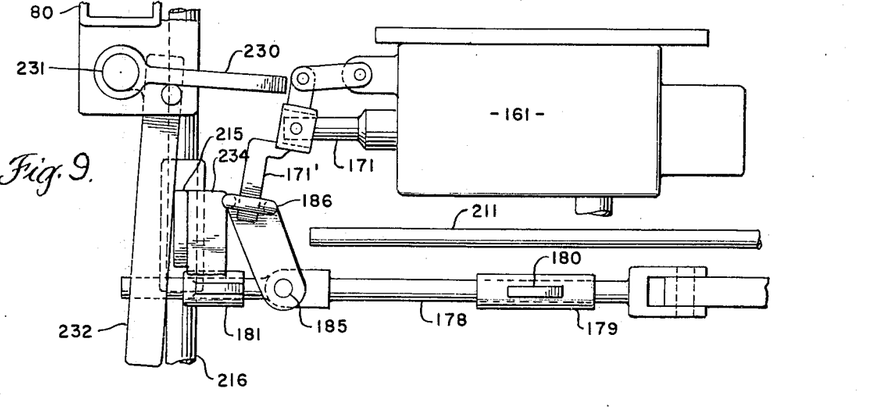
FIG. 9 is a fragmentary elevational view looking in the direction of the arrows 8—8 in FIG. 1.
Figure 10:
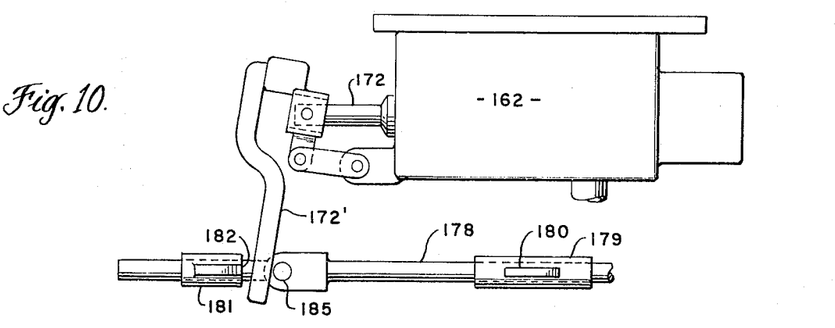
Figure 11:
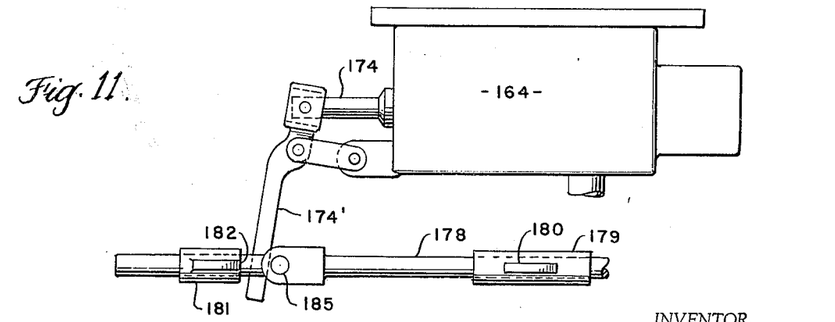

Referring to FIGS. 9, 10, and 11, it may be seen that the actual tripping of the valve stems 171, 172, and 174 is accomplished by pivoted levers connected to the valve stems and bearing the reference numerals 171', 172', and 174'. When the arm 178 is moved to the right while in the lower position, illustrated in solid lines in FIG. 6, the cam face 182 passes under the valve stem mechanism 172 and does not trip the valve 162, although the lower face of cam member 181 does engage lever 174' and actuates valve 164 (FIG. 11). When the arm 178 is raised to its upper position and moved to the right, the cam face 184 passes above lower valve stem throwing lever 174', and does not actuate the valve 164; however, the cam face 182 does engage valve operating lever 172' and actuates valve 162. Because of the vertical lost-motion connection afforded by loop 186 relative to upper valve stem operating lever 171', the upper valve 161 is operated upon each horizontal reciprocation of the arm 178 whether it be in the bottom most position as shown in FIG. 6 or in its upper most position. It should be noted in FIGS. 6, 10, and 11 that the vertical arm 185 extends along the opposite side of the valve actuating levers 172' and 174' from that of the cam faces 182 and 184. Thus, while movement to the right, by arm 178, operates the valve levers 172' or 174' via cam surfaces 182 or 184, movement of rod 178 to the left returns the valve levers 172' or 174' to the left because of engagement therewith by arm 185. In the case of upper most valve 161, the loop 186 throws the lever 171' in either direction along with reciprocation of arm 178.

At the bottom of FIG. 6 a bale responsive trip member 188 may be seen. In FIG. 8, it may be seen that the trip 188 is substantially centered between the sides of bale stacking chamber 36. The trip 188 is almost completely hidden in FIG. 8 by the U-shaped strap 114 of pusher 54. The trip 188 is in position to be actuated by each bale delivered into the stacking chamber by the bale pickup device 38. Trip member 188 is supported from main cross frame member 76 by a clamp device 189 (see FIGS. 6 and 7). Referring to FIG. 6, as a bale moves from the pickup device into the bale stacking chamber, it pivots the trip 188 from the position shown in solid lines in FIG. 6 to the position shown in dot-and-dash lines. This movement drives a hooked arm 190, which is rigid with the pivoted bale trip 188, from the solid line position shown in FIG. 6 to the dot-and-dash position. An extension arm 191 rigidly connected to the hooked arm 190 is also moved from the solid line position of FIG. 6 to the dot-and-dash position. At the upper end of extension arm 191 a generally horizontal arm 192 is pivotally connected thereto. The arm 192 has a hook 194 formed on the lower edge thereof as may be seen near the center portion of FIG. 6. An arm member 195 has its upper end connected to arm 178 by a pin 196 extending through a lost-motion slot 198 in the arm 178. The arm 195 is fulcrumed near its upper end on a pivot pin 200 carried on a support arm 201 fixed to the valve unit. The arm 195 has a bifurcated lower end 197. A pin 202 extends between the bifurcations 197 of arm 195 and underlies the arm 192. It will be apparent in FIG. 6 that as the arm 192 moves from the solid line position to the dot-and-dash line position, the under surface of arm 192 slides along pin 202 until the hook 194 passes the pin 202. When the hay bale clears trip member 188, the trip 188 and arms 190 and 191 are snapped back to the solid line position shown in FIG. 6 by the action of a tension spring 204 which is interconnected between the hooked arm 190 and the fixed support arm 201. This action also returns arm 192 leftward in FIG. 6 from the dot-and-dash position to the dash line position. In moving from the dot-and-dash line position to the dash line position, the hook 194 on the underside of arm 192 engages pin 202 on the bifurcated arm 195 thereby pivoting the arm 195 clockwise about its fulcrum pin 200. This movement of arm 195 carries pin 196 to the end of lost-motion slot 198 in arm 178 and then drives the arm 178 to the right from its solid line position in FIG. 6 to its phantom line position thereby actuating valve 161 and one or the other of valves 162 and 164, depending on whether arm 178 is in its upper or lower position. In moving from the dot-and-dash line position to the dash line position, arm 192 is held downwardly into engagement with pin 202 by a spring 205 interconnected between the arm 192 and the hooked arm 190. This insures that hook 194 will not jump over and miss pin 202. Note in FIG. 6 that a stop pin 206 in arm 191 engages the underside of arm 192 and stops it in the dash line position. The bifurcated arm 195 is driven clockwise about its fulcrum pin 200 to disengage pin 202 from hook 194 by a spring 208 interconnected between bifurcated arm 195 and a bracket arm 209 on the three-valve unit. It will be apparent in FIG. 6 that as bifurcated arm 195 is driven clockwise about its fulcrum pin 200 from the solid line position, it reaches a dead center location wherein the spring 208 is in a common substantially vertical plane with the fulcrum pivot pin 200. As the spring 208 passes this dead center plane, it continues to urge bifurcated arm 195 clockwise beyond the extent of movement of hook 194 thereby disengaging pin 202 from hook 194. The final position of double arm 195 is defined by a stop member 210 carried by the fixed support arm 201. At this stage of the operation, the arm 178 has been moved to the right and the appropriate valves 161 and 162 or 164 have been actuated.

The next step in the operation of this valve actuating linkage is to return arm 178 to the left deactivating the valve and returning bifurcated arm 195 counterclockwise to the solid line position from the dash line position, in order that it be properly set for the next triggering operation. This is accomplished through the medium of a push rod 211 which is connected to bifurcated arm 195 and 212 just below fulcrum pin 200. The arm 211 extends generally horizontally under the three valve unit and is supported on the valve mounting bracket. In FIG. 6 it may be seen that the free end 214 or rod 211 is moved to the left from the solid line position into engagement with a plate 215 when bifurcated arm 195 is moved to the dash line position. The plate 215 is mounted for povital movement about a rod 216 fixedly mounted on the upright frame members 80 of the stacking chamber. When plate 215 is pivoted in the clockwise direction about rod 216, it pushes rod 211 back to the solid line position shown in FIG. 6, thereby returning arm 178 to the right to its solid line position.

Figure 7:
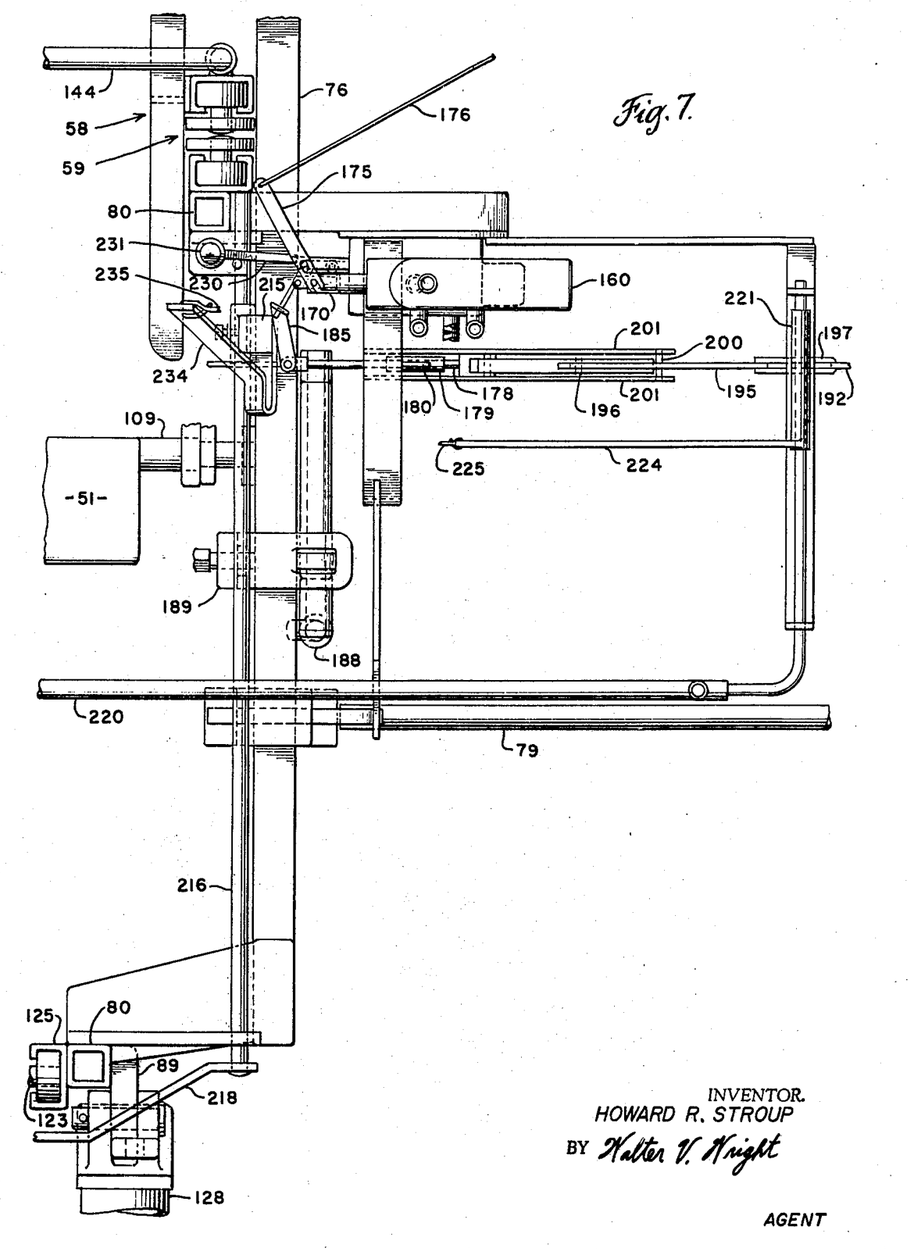
FIG. 7 is a plan view of the mechanism shown in FIG. 6.

One manner in which the plate 215 may be pivoted about the rod 216 is by effecting a clockwise upward movement of a trip arm 218, which is shown in phantom lines in FIG. 6 extending generally horizontally rearwardly from pivot rod 216 (see FIG. 7). The trip arm 218 is fixedly connected reltaive to plate 215. Referring now to FIG. 4, rod 216 and arm 218 are visible in this figure. The rod 216 is located directly above the hydraulic cylinder 90. The arm 218 is shown extending horizontally to the right from rod 216 in solid lines, and upwardly from rod 216 at approximately a 20° angle in phantom lines. A pad 219 may be seen fixedly attached to the upper edge of bale elevator arm 86 near the mid-portion of the arm. In the phantom line position of arm 86 it will be apparent that pad 219 has engaged the underside of trip arm 218 and elevated it to the 20° elevated position. In FIG. 6 it will be apparent that this 20° elevation of trip arm 218 will pivot plate 215 clockwise about rod 216 thereby driving arm 211 and the bifurcated arm 195 back past the over center position of arm 195 whereupon spring 208 will return arm 195 to the solid line position of FIG. 6, thereby driving arm 178 to the left to reset the valves 161 and 162 or 164.

In FIG. 5, it may be seen that a trip arm 220 is pivotally mounted at 221 on a bracket carried by the control valve assembly. Trip arm 220 extends horizontally over bale stacking chamber 36 and has a downwardly depending end which carries a shoe 222. The trip arm 220 and its pivotal mounting 221 are visible at the top of FIG. 6. When two bales have been elevated by plate 45 and rest on top of bale supporting members 49, 50, and 51, the uppermost bale will have moved upwardly under shoe 222 and elevated trip arm 220 above the horizontal position shown in the drawings. An arm 224, visible in FIGS. 6 and 7, is rigidly affixed to trip arm 220. A cable 225 is interconnected between arm 224 and the support rod 180 (see FIG. 6) which carries sleeve 179 which, in turn, supports arm 178. A spring 226 is interposed between cable 225 and rod 180. Thus, when trip arm 220 has been elevated by the formation of a column of bales of sufficient height in the stacking chamber 36 above bale supporting members 49, 50, and 51, the arm 178 is elevated to align cam surface 182 of trip 181 with stem 172 of valve 162. This results, when the next bale clears bale trip 188, in the actuation of valve 162 which, as previously described, operates hydraulic cylinder 128 to advance vertical bale pushers 52 and 54.

In FIGS. 4 and 8, a rod 228 may be seen extending upwardly at an angle from the top of bale pusher member 52. Rod 228 is welded to member 52 and has an upper end 229 which is formed at right angles to the main body of rod 228 and extends in a horizontal direction toward bale carrying bed 32. When pusher member 52 advances across the stacking chamber to the position shown in FIG. 8, the end 229 of rod 228 engages a trigger plate 230. Trigger plate 230 is shown more clearly in FIG. 6. Plate 230 is fixedly mounted on a vertical rod 231, which is journalled on one of the stacking chamber vertical frame members. At the lower end of rod 231 is a right angle horizontal portion 232 which lies directly behind the previously discussed trip plate 215. From FIGS. 6, 7, and 8, it will be apparent that as pusher members 52 and 54 reach the end of their operative strokes, the end 229 of rod 228 engages and pivots plate 230 and rod 231 about the axis of the rod 231. When this occurs, the horizontal end 232 of rod 231 engages and pivots plate 215 about its pivot member 216 to reset the rod 211, bifurcated arm 195, arm 178 and valve 162. Since the column of bales has now been pushed laterally onto bale carrying bed 32 and out from under shoe 222 of trip arm 220, the trip arm 220 drops back to the horizontal position under the influence of gravity, thereby lowering rod 180 and arm 178 to the position shown in FIG. 6 wherein the next actuation of bale trip member 188 will result in operation of the lowermost valve 164 of the tree-valve unit. Thus, when the next bale is received the eleavtor plate 45 will be elevated to begin forming the next vertical column of bales while the pusher members 52 and 54 will remain retracted since cam face 182 of trip member 181 will be moving in a horizontal plane below the level of valve stem 172. In an emergency it may be necessary to reverse one of the mechanisms such as the elevator plate 45 or the pusher members 52 and 54 before they have completed their full working strokes, or in other words, before they have actuated their respective linkage and valve reversing and resetting trip members. In FIGS. 6 and 7, it may be seen that an arm 234 is welded to the upper portion of pivot plate 215 and extends upwardly therefrom. A cable 235 is connected to the upper end of arm 234 and extends forwardly to the tractor operator. In an emergency situation, the tractor operator can prematurely operate the reversing and resetting trip plate 215 by simple pulling on cable 235.

Figure 24:
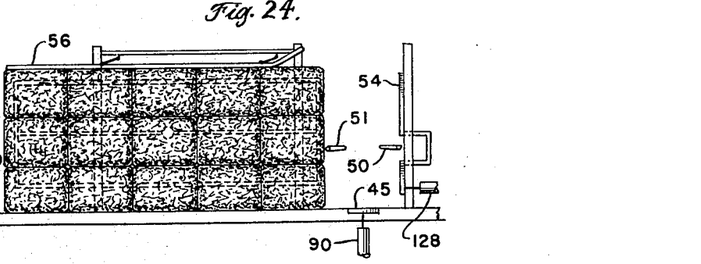
FIG. 24 is a diagrammatic rear elevational view of the stacker, similar to FIGS. 21–23, but showing the bale carrying bed fully loaded with columns of bales.

When bale carrying bed 32 is full of vertical columns of bales as illustrated in FIG. 24, the pusher frame 58 may be actuated, as desired, by the opeartor to deposit the load on the ground in any selected location. Actuation of pusher frame 158 is effected through operation of hydraulic cylinder 140, whose operation is controlled by double acting valve 160, which is manipulated by the tractor operator as previously described by way of control cable, or rod, 176.

Operation

Figure 12:
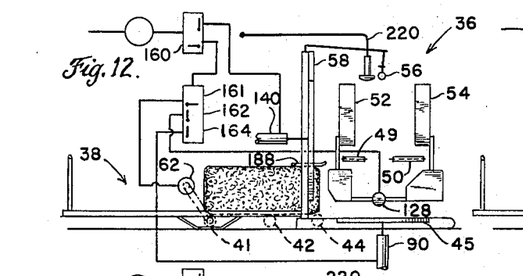
FIGS. 12–20 are diagrammatic elevational views corresponding to the structural view shown in FIG. 4 and illustrating in sequence, the building of a three-layer column of bales in the stacking chamber and including the diagrammatic illustrations of the accompanying operation of the hydraulic control valves shown in FIG. 6.
Figure 13:
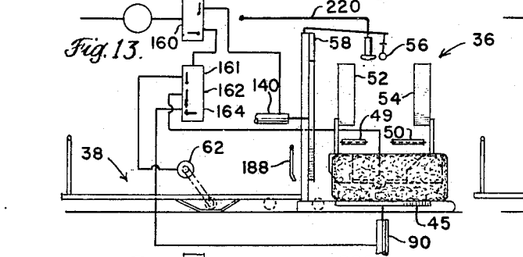
Figure 14:
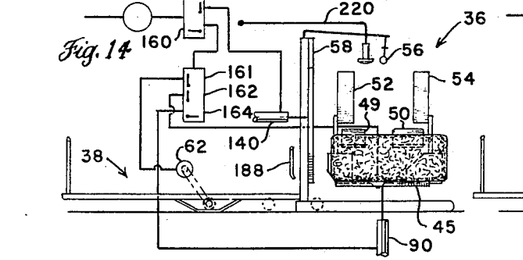
Figure 15:
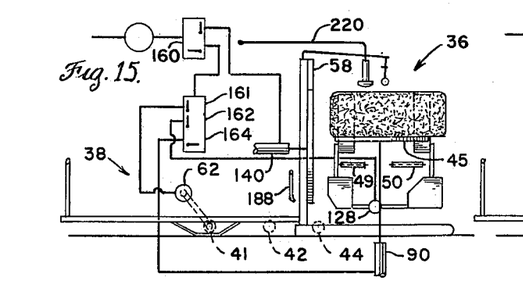
Figure 16:
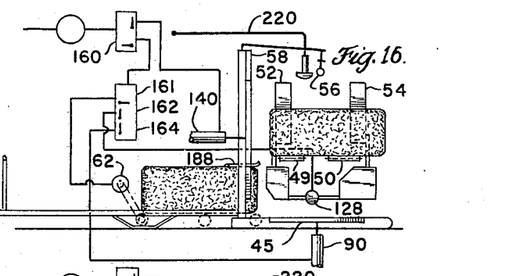
Figure 17:
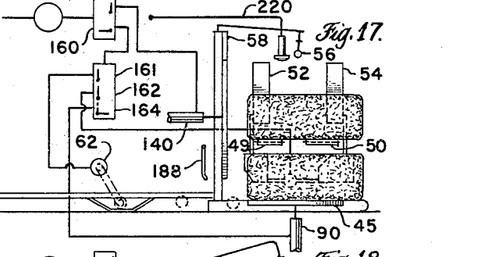
Figure 18:
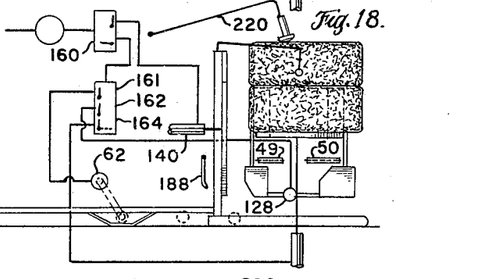
Figure 19:
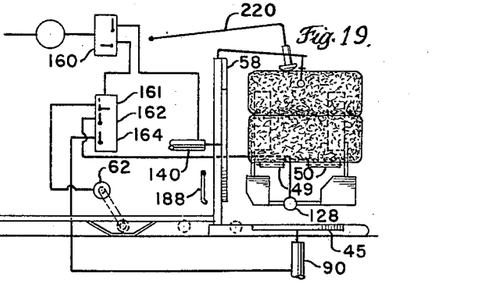
Figure 20:
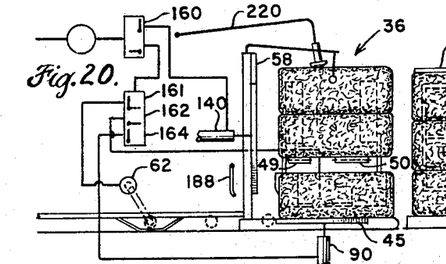
Figure 21:
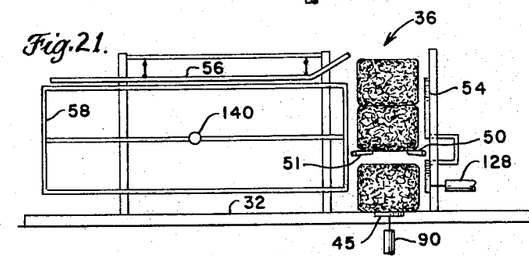
FIGS. 21–23 are diagrammatic rear elevational views of the stacker illustrating, in sequence, the operation of the mechanism for moving a completed column of bales laterally out of the stacking chamber onto the bale carrying bed.
Figure 22:
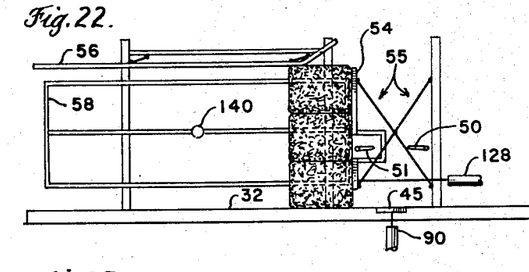
Figure 23:
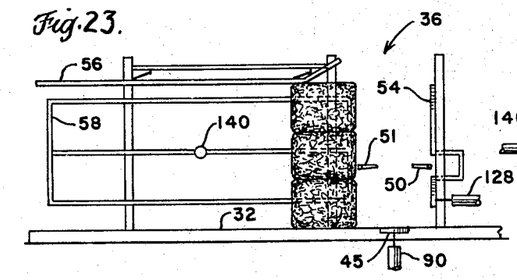
Figure 25:
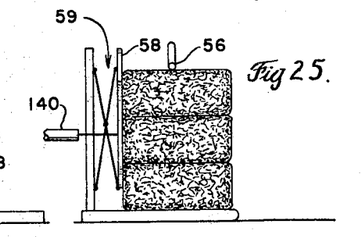
Figure 26:
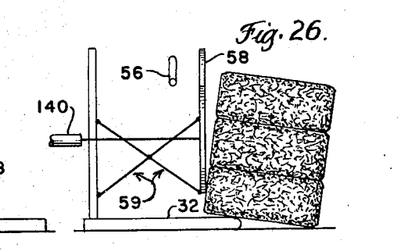

The sequence of diagrammatic FIGS. 12–20 illustrates the formation of a vertical column of bales in stacking chamber 36. In FIG. 12 a first bale has been picked up and started rearwardly toward stacking chamber 36 by the rotary feeding elements 41, 42, and 44 of the pickup device 38. The bale has elevated bale trip 188 from its normal vertical position to the horizontal position shown. In FIG. 13, the first bale has moved into stacking chamber 36 and rests on bale elevating plate 45. The bale trip 188 has snapped back to its normal vertical position thereby effecting the closing of valve 161 to stop rotary feeding elements 41, 42, and 44, and the opening of valve 164 to actuate cylinder 90 of the bale elevator mechanism. In FIG. 14 elevator plate 45 is in the process of elevating the first bale. The bale supporting members 49 and 50 have been pivoted upwardly by the bale as it is being raised. In FIG. 15, the elevator plate 45 is at the top of its range of travel. The bale supporting members 49 and 50 have snapped back to their horizontal positions under the elevated bale. It is at this point the pad 219 on elevator arm 86 (see FIG. 4) has pivoted trip arm 218 sufficiently to reset valves 161 and 164 thereby lowering elevator plate 45 and reactivating the hydraulic motor 62 of rotary feed elements 41, 42, and 44 of the pickup. The operations illustrated in FIGS. 16 and 17 are the same as those of FIGS. 12 and 13 except that the first bale is now supported above members 49 and 50. In FIG. 18 the second received bale has been elevated under the first bale. This carries the first bale upwardly under trip arm 220 which sets the valve actuating linkage so that the next actuation of bale trip 188 will effect operation of valves 161 and 162 instead of 161 and 164. FIG. 19 shows the apparatus ready to receive the third bale. The trip arm 220 is held in the elevated position by the two bales resting on bale supporting members 49 and 50. In FIG. 20, the third bale has entered the stacking chamber 36 and effected a trip of trip member 188. Since the trip arm 220 is elevated, the valve 162 is opened in place of the elevator valve 164. Valve 162 controls the supply of hydraulic fluid to cylinder 128 to push the three bale column of bales onto bale carrying bed 32 via pushers 54 and 52 (52 hidden behind 54). The discharging of the column of bales from stacking chamber 36 is illustrated in FIGS. 21, 22, and 23. It should be noted that as the column of bales is moved laterally onto bale carrying bed 32, it moves out from under trip arm 220 allowing that arm to return to its normal horizontal position and readying the device once again for the sequence of operation beginning in FIG. 12. The operation of hold down bar 56 is also apparent from FIGS. 21–23. FIG. 24 shows the load-carrying bed 32 completely filled by five vertical columns of bales with three bales in each column. At this point the operator may transport the load to any desired unloading location. At the desired unloading location, the operator manually operates valve 160 which controls the hydraulic cylinder 140 to operate push off frame 58 to discharge the entire load as illustrated in FIGS. 25, 26, and 27.

In advancing from the one column load situation illustrated in FIG. 23 to the full column load conditioner illustrated in FIG. 24, it should be mentioned that when pusher members 52 and 54 discharge the second vertical column of bales from stacking chamber 36 onto bale carrying bed 32, the previously discharged column of bales is pushed laterally on bale carrying bed 32 by the advancing column of bales being discharged. Each subsequent column of bales moved from the stacking chamber onto the bale carrying bed effects lateral transfer of the preceding columns across bed 32 by one additional bale width. Attention is also directed to the fact that bale trip 188 and trip arm 220 (see FIGS. 6 and 5) are each made up of at least a pair of members slidably adjustable relative to each other and clamped together by set bolts 238. By adjusting the relatively slidable members and reclamping set bolts 238, the bale trips may be varied in length to adapt the stacker for use with bales from all the conventional size hay balers.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains.

Having thus described my invention, what I claim is:

1. A device for accumulating individual bales of hay into stacks and adapted for movement over the ground comprising, in combination:
    a frame;
    a horizontally extending bale carrying bed on said frame;
    a vertical bale stacking chamber disposed on said frame at one side of said bale carrying bed and having a forwardly opening bottom portion for receiving bales and a laterally opening side portion adjacent said bale carrying bed for discharging bales;
    means extending forwardly of said chamber for picking up bales from the ground and delivering them one at a time to said forwardly opening bottom portion of said chamber, said means for picking up bales from the ground, said bale carrying bed and said vertical stacking chamber forming an integral L-shaped structure, said bale carrying bed extending transverse to the direction of movement of the device and said stacking chamber being disposed at the apex of said L-shaped structure;
    elevating means in said chamber for raising a bale upwardly through a height at least equal to that of a bale as it lies on the ground to form a vertical column of bales in said chamber;
    means in said chamber for displacing a completed column of bales through said lateral opening and onto an adjacent area of said bed to form a stack of bales; and
    stack discharging means including a pusher member adjacent said column receiving area of said bed for discharging a completed bale stack from said bed.

2. A device for accumulating individual bales of hay, as recited in claim 1, wherein said elevating means in said chamber comprising a generally horizontal plate, means for reciprocating said plate vertically between an at rest position wherein said plate constitutes the floor of said chamber and an elevated position at least a bale height above said at rest position, drive means for a rotary conveyor means, said rotary conveying means being disposed on said pick-up means and control means disconnecting said rotary conveyor drive means when said plate is elevated above its at rest position.

3. A device for accumulating individual bales of hay, as recited in claim 2, wherein said elevating means further comprises means in said chamber engageable with the underside of a bale supported on said plate when said plate is in said elevated position to retain said bale in an elevated position upon return movement of said plate to said at rest position, said retaining means comprising hinge means disposed along opposite sides of said chamber and having parallel fore-and-aft extending pivot axes, bale supporting plates carried by said hinge means for swinging movement between horizontal bale supporting positions and vertical retracted positions, and wherein said means in said chamber for displacing a completed column of bales from the chamber onto said adjacent area of said bed comprises a vertically extending pusher normally disposed along the side of said chamber opposite said laterally open side, means for reciprocating said pusher horizontally across said chamber perpendicularly to said hinge axes, said pusher having an upper portion above said hinge axes to engage and move bales above said hinge plates and a lower portion below said hinge axes to engage and move the bale disposed on said elevating plate in its at rest position.

4. A device for accumulating individual bales of hay, as recited in claim 1, wherein said pusher member is mounted on said frame and is horizontally reciprocable for movement in the fore-and-aft direction across said bale carrying bed between a retracted position and a bale column discharging position, and said stack discharging means further includes means mounted on said frame to engage and steady columns of bales supported on said bed, and means operatively connected to said column steadying means to move said column steadying means out of engagement with said columns of bales upon reciprocation of said pusher member from its retracted position toward its discharge position.

5. A device for accumulating individual bales of hay into stacks comprising, in combination:
    a frame adapted for movement over the ground behind a tractor;
    a horizontally extending bale carrying bed on said frame;
    bale stacking means on said frame at one side of said bale carrying bed, said bale stacking means comprising a chamber having a forwardly opening bottom portion through which bales are received and a laterally opening side portion adjacent said bale carrying bed through which a bale stack is discharged;
    receiving means on said frame ahead of said chamber for engaging individual bales on the ground and discharging each bale rearwardly into said forwardly open bottom portion of said chamber, said bale carrying bed and said receiving means forming an L-shaped structure with said bale stacking means disposed at the apex thereof;
    means in said chamber for elevating bales in the chamber a distance at least equal to that of a bale as it lies on the ground;
    means for cyclically operating said elevating means for elevating successively received bales upwardly under the bottom of a precedingly elevated bale to build a vertical column of bales of a predetermined height;
    means in said chamber for displacing a completed column of bales through said lateral side opening and onto an adjacent area of said bed to form a stack of bales; and
    stack discharging means adjacent said column receiving area of said bed for discharging a completed bale stack from said bed, said stack discharging means including a horizontally reciprocable pusher member mounted on said frame for moving across said bale carrying bed between a retracted position and a bale stack discharging position.

6. A device for accumulating individual bales of hay, as recited in claim 5, wherein said means in said chamber for elevating bales includes a generally horizontal plate and means for reciprocating said plate vertically in said chamber, and said stack discharging means further includes means mounted on said frame for engaging and steadying columns supported on said bale carrying bed and means operatively connected to said column steadying means to move said column steadying means out of engagement with said bale stack upon reciprocation of said pusher member from its retracted position toward its discharging position.

7. A device for accumulating individual bales of hay, as recited in claim 5, wherein said means in said chamber for elevating bales comprises:
- a generally horizontal plate;
- means for reciprocating said plate vertically in said chamber between an at rest position wherein said plate constitutes the floor of said chamber, and an elevated position at least a bale height above said at rest position;
- means in said chamber engageable with a bale supported on said plate when said plate is in said elevated position for retaining said bale in said elevated position upon return movement of said plate to said at rest position, said retaining means comprising hinge means for swinging movement between a horizontal bale supporting position and a vertical retracted position; and said means in said chamber for displacing bales comprises:
- a vertically extending pusher normally disposed along said chamber side wall opposite said lateral side opening; and
- means for horizontally reciprocating said pusher across said chamber, said pusher having an upper portion above said hinge axes for engaging bales above said hinge plates and a lower portion below said axes for engaging a bale disposed on said elevating plate in its at rest position.

References Cited

UNITED STATES PATENTS

| | | | |
|---|---|---|---|
| 2,362,038 | 11/1944 | Way et al. | 198—7 |
| 2,376,176 | 5/1945 | Neja | 214—6 |
| 2,702,131 | 2/1955 | Leupke | 214—6 |
| 3,035,716 | 5/1962 | Lamb et al. | 214—6 |
| 3,159,287 | 12/1964 | Stroup | 214—6 |
| 3,163,302 | 12/1964 | Pridgeon | 214—6 |
| Re. 25,750 | 3/1965 | Adams et al. | 214—6 X |
| 3,197,043 | 7/1965 | Unger | 214—6 |
| 3,251,485 | 5/1966 | Fancher | 214—6 |
| 3,278,049 | 10/1966 | Hollyday | 214—6 |

OTHER REFERENCES

German printed application, No. 1,130,365 May 24, 1962.

GERALD M. FORLENZA, Primary Examiner

ROBERT J. SPAR, Assistant Examiner

U.S. Cl. X.R.

214—518